United States Patent [19]

Belunova et al.

[11] Patent Number: 5,569,423
[45] Date of Patent: Oct. 29, 1996

[54] PROCESS FOR THE MANUFACTURE OF A SILICA FIBER BASED HEAT INSULATING MATERIAL

[75] Inventors: Ludmila V. Belunova; Vladimir N. Gribkov; André I. Chernyak; Galina T. Mizyurina; Oleg A. Mordovin; Elena E. Mukhanova, all of Moscow, Russian Federation

[73] Assignees: Aerospatiale Societe Nationale Industrielle, Paris, France; VIAM - All Russian Institut of Aviation Materials, Moscow, Russian Federation

[21] Appl. No.: 390,508

[22] Filed: Feb. 17, 1995

[30] Foreign Application Priority Data

Feb. 17, 1994 [FR] France .................... 94 01825

[51] Int. Cl.$^6$ ........................................ B28B 1/26
[52] U.S. Cl. ................................ 264/60; 264/87
[58] Field of Search .................... 264/60, 86, 87

[56] References Cited

U.S. PATENT DOCUMENTS

| 3,932,161 | 1/1976 | McNish | 65/3 |
| 3,935,060 | 1/1976 | Blome et al. | 162/152 |
| 3,976,728 | 8/1976 | Hawthorne | 264/26 |

FOREIGN PATENT DOCUMENTS

| 506162 | 9/1992 | European Pat. Off. . |
| 522900 | 1/1993 | European Pat. Off. . |
| 2684369 | 6/1993 | France . |
| 8413614 | 6/1986 | Germany . |
| 3942528 | 6/1991 | Germany . |
| 2250996 | 6/1992 | United Kingdom . |

OTHER PUBLICATIONS

AN 91–198651, DATABASE WPI, Derwent Publications Ltd., Week 9127, May 1991.

*Primary Examiner*—Christopher A. Fiorilla
*Attorney, Agent, or Firm*—Burns, Doane, Swecker & Mathis, L.L.P.

[57] ABSTRACT

A process for making light, fibrous heat insulating materials wherein the silica fibers used in the process are quartz fibers formed by spraying quartz. The fibers are predispersed in water until there is formed a homogeneous flowing slurry from which is molded a green fibrous block, with simultaneous partial removal of water. This green fibrous block is dispersed in water and mixed with an aqueous emulsion containing an organosilicon binder, a boron-containing sintering adjuvant and a surface-active agent. A green billet is molded from the suspension thus obtained, a portion of the water being simultaneously removed by suction. The green billet is compressed until the desired height is obtained and then it is dried, in the compressed state, at a temperature of up to 300° C. The billet is released from pressure and fired at high temperature.

9 Claims, No Drawings

PROCESS FOR THE MANUFACTURE OF A SILICA FIBER BASED HEAT INSULATING MATERIAL

FIELD OF THE INVENTION

The present invention generally relates to the manufacture of light fibrous heat insulating materials that are mainly useful for the heat insulation of atmosphere re-entry type space shuttle orbiters and, in general, spacecrafts or space-cabins.

BACKGROUND OF THE INVENTION

The characteristics required for such materials include the possibility of being used at temperatures of 1200° to 1500° C., the lowest possible density and thermal conductivity and the highest possible compressive strength, bending strength, tensile strength, resistance to thermal shocks through heating and cooling, resistance to strong acoustic vibrations and other characteristics.

A first generation of re-usable heat insulating materials comprised fibrous, slightly sintered systems such as the systems of the Lockheed Insulation (LI) type bearing the trade names LI-900, LI-1500 and LI-2200 and having densities of 144 kg/m$^3$ (0.144 g/cm$^3$), 240 kg/m$^3$ (0.240 g/cm$^3$) and 352 kg/m$^3$ (0.352 g/cm$^3$), respectively, which materials are formed of silica fibers.

According to the known method, these materials were manufactured by forming, in a V-blender, a slurry comprising silica fibers having a diameter of 1 to 3 μm and water purified on ion exchange resins, in the presence of starch, ammonia and a surface-active agent, by then pouring this slurry into a rectangular mold with perforated bottom and side walls, and then slightly compressing the slurry in the mold with partial removal of water. The green billet thus obtained was then dried at temperatures of up to 105° C. (220° F.), fired at temperatures of up to 1260° C. (2300° F.) and the resulting sintered billet was machined to obtain the desired final dimensions and shape.

The main disadvantages of the materials identified hereabove were: considerable shrinkage representing nearly 25% (linear shrinkage) after 16 hours at 1250° C., related to the low thermal resistance of the fibers and strength or tenacity not exceeding 0.08 MPa under tension in the "weak" direction for a material with a density of 144 kg/m$^3$, because of the poor sintering of the fibers into a skeleton.

A second generation of the materials in question, known as FRCI (Fibrous Refractory Composite Insulation) did not have such drawbacks. Their strength was improved by intensification of the sintering process using easily fusible boron-containing additives. In addition, the inevitable tendency in this process to additional shrinkage was compensated for or neutralized by the introduction into the system of more refractory aluminoborosilicate fibers of the "Nextel®-312" type. Now, the main basis of the process was the same as in the process for manufacturing LI type materials, except that the larger diameter (11 μm) of the twisted "Nextel®" fiber introduced impeded its dispersion and that it was difficult to produce the material with a homogeneous structure.

The third and last generation of materials of the type in question is formed by the so-called HTP (High Thermal Performance) and AETB (Alumina Enhanced Thermal Barrier) materials.

The HTP materials of different kinds and densities include the combination of silica fibers and alumina fibers having a diameter of 3 μm.

The AETB material is a three-component composition comprising silica fibers, 3 μm aluminoborosilicate fibers and 3 μm alumina fibers. In either case, the sintering of the fibers to form the skeleton is carried out thanks to the presence of easily fusible boron anhydride which is formed from boron or its compounds upon firing.

Owing to the fact that the geometrical parameters of the silica fibers and the ceramic fibers were brought closer together, the materials of the third generation ensured more homogeneous mixing of the ingredients, uniformity of the macro- and micro-structures and less dissipation of properties.

Despite their positive characteristics, the materials of the second and third generations have a common disadvantage, i.e. that it is difficult to combine the ingredients of a 2 or 3-component system, which leads to non-homogeneous structure and properties. There also is the added risk of high internal stresses owing to the fact that the thermal expansion coefficients and other properties of the silica fibers and of the ceramic fibers are different. The fact that the "Nextel®" and "Saffil®" type fibers used are far more costly than silica fibers and that, consequently, the price of the final product increases substantially is also important.

SUMMARY OF THE INVENTION

The object of the present invention is to provide a one-component silica fiber based material which is simpler in its composition and in its manufacturing technology, a material the properties of which are the same as those of the materials of the FRCI, HTP and AETB types.

This object is accomplished according to the invention thanks to the use, as a fibrous ingredient, of a quartz fiber that is formed by quartz spraying. This fiber is pre-dispersed in water until there is formed a homogeneous flowing slurry, from which a fibrous block is molded with simultaneous partial removal of water. Then, an aqueous emulsion is prepared from an organosilicon therefor binder, a surface-active agent and a sintering adjuvant. The green fibrous block is dispersed in water and mixed with the aforementioned aqueous emulsion. The suspension thus formed is molded into a green billet. The water is removed by suction. The height of the billet is adjusted to the value required by compression using perforated plates; then it is dried, in a compressed state, at a temperature of up to 300° C. Then, the billet is removed from the mold and fired at high temperatures.

More specifically, the object of the invention is a process for the manufacture of silica fiber based heat insulating material comprising:

forming an aqueous suspension containing a fibrous ingredient, a binder, a substance containing boron as a sintering adjuvant and a surface-active agent;

molding, from the said suspension, a green billet with partial removal of water; and drying this billet and firing it at high temperature, characterized in that:

the fibrous ingredient is constituted by quartz fiber formed by quartz spraying;

the said fiber is pre-dispersed in water until the formation of a homogeneous flowing slurry from which is molded a green fibrous block, with simultaneous partial removal of water;

this green fibrous block is dispersed in water and it is mixed with an aqueous emulsion containing an organosilicon binder, a boron containing sintering adjuvant and a surface-active agent;

a green billet is molded from the suspension thus obtained, the water being removed by suction;

the green billet is compressed until the desired height is obtained and it is dried, in a compressed state, at a temperature of up to 300° C.;

this billet is released and 300° C. fired at high temperature.

It is preferable to disperse the fiber in a blender equipped with a propeller mixer with a shifted axis, at a mixer rotation speed of 2000 to 3000 rpm and at a fiber concentration in the water of 1 to 5 volume %. The fiber concentration will be chosen in this range as a function of the density required for the final material.

Advantageously, the fibrous block is molded in a mold provided with a perforated bottom, from which the water is removed under a vacuum of 0.01 to 0.04 MPa.

As an organosilicon binder, one can choose an alcoholic solution of polyethoxysiloxane, the quantity of which, evaluated as $SiO_2$, is such that it represents 5 to 25 weight % in relation to the weight of quartz fiber.

As a boron containing sintering adjuvant, it is preferable to use amorphous boron powder having a mean particle diameter of 0.5 to 2.0 μm, which is pre-treated with a solution at a concentration of 0.5 to 3.0 weight % of trimethylchlorosilane in an organic solvent such as toluene, and then dried at a temperature of up to 300° C.

The surface-active agent used is preferably non-ionic.

Preferably, the emulsion is formed by mixing in water: the alcoholic solution of polyethoxysiloxane, the surface-active agent and the amorphous boron powder, in a blender equipped with a propeller mixer, with a mixer rotation speed of 2500 to 4000 rpm, for 1 to 2 minutes. Preferably the quantity of boron in the emulsion is chosen to be from 0.5 to 2.5 weight % in relation to the weight of the fiber.

Mixing of the green fibrous block dispersed in the water with the emulsion formed can be carried out in a blender equipped with a planetary mixer having a speed of rotation of 50 to 150 rpm, with a fiber concentration of 1.5 to 6.0 volume %. Preferably, the height of the green molded billet is reduced by a value of up to 10% of the initial height, by slight compression between perforated plates.

High temperature firing is carried out in conformity with the purity requirements, which exclude crystallization of the quartz fiber.

According to the process indicated above, it is possible to manufacture a material having a density in the range of 100 to 400 kg/m³ (0.10 to 0.40 g/cm³) and uniform macro- and micro-structure. If it is wished to obtain modifications to the degree of fiber orientation, fiber concentration has to be modified, in the aforementioned range of 1.5 to 6 volume %, during mixing in a blender at low mixer speeds of rotation.

The main index of material strength (particularly in applications as a re-usable heat shield) is the tensile strength in the "weak" direction, that is to say perpendicularly to the molding plane which is, on average, from 0.32 to 0.36 MPa for a density of 120 kg/m³ (0.120 g/cm³), from 0.43 to 0.48 MPa for a density of 144 kg/m³ (0.144 g/cm³), 0.65 to 0.70 MPa for a density of 200 kg/m³ (0.20 g/cm³), etc., the relative increase in this strength being in the order of 1.5 times that of the density.

Mean linear shrinkage is in the range of 4 to 8% after 36 hours at 1250° C. under isothermal conditions and does not exceed a maximum of 14%. Material with a density of 144 kg/m³ after heating on one side at a temperature of up to 1550° C. for two cycles of 20 minutes each, exhibits linear shrinkage not exceeding 0.6 to 0.8% in the most heated zone.

The material according to the invention is highly resistant to crystallization. Upon heating up to 1250° C. for 36 hours, the α-cristobalite content does not exceed 0.5 to 1.0 weight %. In practice, the thermal conductivity of the materials having the aforementioned different densities and subjected to the aforementioned temperature and air pressure conditions, is the same (within the limits of errors in measurement) as that of the material of the LI type and of the other variants of this type.

Consequently, given the properties that it exhibits when used, and of its other important properties, the one-fibrous component material, obtained from quartz fibers, according to the invention and which is manufactured using the process described above is in no way inferior to the more costly multi-fibrous components silica and ceramic fiber based materials fabricated by means of more complicated processes.

The invention will be described in greater detail with the help of the following non-limitative examples.

EXAMPLE 1

190 g of quartz fibers obtained using technique TU 6 11 15191 87, marketed under the name of "CBK® Superquartz Fibers" and having a mean diameter of 1.5 μm were placed in a blender having a propeller mixer with a shifted axis. 6 liters of distilled water were poured into the blender (the fiber concentration was thus 1.45 volume %). Dispersion was carried out at a mixer rotation speed of 3000 rpm until the dispersed mass was transformed into a homogeneous flowing slurry. This slurry was poured into a mold with a perforated bottom, a vacuum of 0.02 MPa being applied to the bottom of the mould for 2 minutes. The molded block was removed from the mold, weighed to determine the amount of residual water and placed in a slowly rotating anchor type planetary blender. Water was added to the blender to bring the total amount of water up to 2.1 l (taking the residual water into account). The suspension thus obtained was mixed for 1 minute at a mixer rotation speed of 100 rpm.

Into a lower capacity blender having a quickly rotating propeller mixer were poured 38 weight % of a solution comprising 46 g of polyethoxysiloxane (15 weight % of silica in relation to the weight of the fibers) and 85 ml of ethyl alcohol.

To this solution were added: 1.9 g (1 weight % in relation to the weight of the fibers) of amorphous boron powder having a mean particle size of approximately 1 μm, 3 g of surface-active agent (Synthenol® DC10: a non-ionic surface-active agent, base: polyethyleneglycol and mono-alcohol ethers derived from acyclic alcohols) and 0.25 l of distilled water. The boron powder used had been pre-air dried for 2 hours at 200° C., then processed with a 1 weight % solution of trimethylchlorosilane in toluene and, finally, air dried again for 3 hours at 250° C.

The above described mixture was emulsified for 1 minute at a mixer rotation speed of 3000 rpm. After that, 1.5 l of water were poured into the emulsion and it was further mixed for 30 seconds at a speed of 3000 rpm.

The emulsion thus obtained was poured into a low rotation speed blender and was mixed with the dispersed fibers, for 30 seconds, at a mixer rotation speed of 100 rmp; the fiber concentration was 2.5 volume %. The resulting suspension was transferred to a mold having a square cross-section of 200×200 mm.

The mold was provided with a perforated bottom; a vacuum of 0.02 MPa was applied to the bottom thereof for 2 minutes. The molded billet was clamped, by the top and the bottom, along its major plane surfaces, between perforated steel plates and the space between the plates, that is to say the height of the billet, was reduced mechanically to 40 mm. The clamped billet was air dried by gradually increasing the temperature to 300° C. over a total time period of 20 hours. The dried billet, after being released from the plates, was fired for 2 hours at a maximum temperature of 1250° to 1280° C., the temperature being increased by 100° C. per hour.

The billet was trimmed so that its dimensions were equal to 190×190×35 mm and that its density of 144±10 kg/m$^3$ (0.144±0.01 g/cm$^3$) was homogeneous.

Tensile strength was, on average, 0.43 to 0.48 MPa (4.3 to 4.8 kg/cm$^2$) in the "weak" direction and 0.60 to 0.65 MPa (6.0 to 6.5 kg/cm$^2$) in the "strong" direction, and bending strength was 0.9 to 1.2 MPa (9 to 12 kg/cm$^2$).

Linear shrinkage was generally from 6 to 8% after 36 hours at 1250° C., under isothermal conditions. After firing, the material was in an amorphous state; after 36 hours at 1250° C., the amount of α-cristobalite formed did not exceed 0.5 weight %.

EXAMPLE 2

535 g of quartz fibers (identical with those of Example 1) were dispersed in 11.5 liters of distilled water (the fiber concentration was thus 2.1 volume %). Then, the process was conducted as in Example 1. Water was added to the blender provided with a slow rotation speed mixer to bring the total amount of water up to 3.8 liters.

The emulsion was prepared as in Example 1. This emulsion comprised: 129 g of polyethoxysiloxane, 240 ml of ethyl alcohol, 5.4 g of boron, 8.5 g of Synthenol® DC10 and 0.7 l of distilled water. As in Example 1, the boron powder was pre-treated with trimethylchlorosilane. The amount of water added to the emulsion in the second step of its preparation was 2.0 l. The fiber concentration in the suspension was 3.5 volume %. The suspension was mixed as in Example 1. The resulting suspension was molded in a mold having a square cross-section, as in Example 1, and the dimensions of the resulting billet were 200×200 mm (cross-section) in a vacuum of 0.02 MPa, but the water removal time was increased to 3.5 minutes. The molded billet was clamped, and its height was adjusted to 80 mm with the perforated plates used in Example 1. The clamped billet was dried for a longer cycle than in Example 1 (27 hours), the temperature being gradually increased to 300° C.

High temperature firing was carried out according to the procedure of Example 1.

The final dimensions of the billet after machining were 190×190×70 mm and its density was 200±20 kg/m$^3$ (0.20±0.02 g/cm$^3$).

Tensile strength was, on average, 0.65 to 0.70 MPa (6.5 to 7.0 kg/cm$^2$) in the "weak" direction and 0.8 to 0.9 MPa (8.0 to 9.0 kg/cm$^2$) in the "strong" direction, and bending strength was 1.8 to 2.0 MPa (18 to 20 kg/cm$^2$). Linear shrinkage after 36 hours at 1250° C. did not generally exceed 4 to 6%; the amount of α-cristobalite formed under these conditions was 0.5 to 1.0 weight %.

We claim:

1. A process for the manufacture of a silica fiber based heat insulating material comprising:

(i) forming an aqueous suspension containing a fibrous ingredient, a binder, a substance containing boron as a sintering adjuvant and a surface-active agent;

(ii) molding, from said suspension, a green billet with partial removal of water; and (iii) drying and firing the billet at high temperature, wherein:

the fibrous ingredient consists of quartz fiber formed by quartz spraying;

the fiber is pre-dispersed in water until there is formed a homogenous flowing slurry from which is molded a green fibrous block, with simultaneous partial removal of water;

the green fibrous block is dispersed in water and mixed with an aqueous emulsion containing an organosilicon binder, a boron containing sintering adjuvant and a surface-active agent;

a green billet is molded from the suspension thus obtained, a portion of the water being removed by suction;

the green billet is compressed until a desired height is obtained and then it is dried, in the compressed state, at a temperature of up to 300° C.; and wherein the billet is released from the pressure of compression and is fired at high temperature.

2. The process according to claim 1, wherein the fiber is dispersed in a blender provided with a propeller mixer with a shifted axis, the mixer having a speed of rotation from 2000 to 3000 rpm and the fiber concentration in water being from 1 to 5 volume %.

3. The process according to claim 1, wherein the fibrous block is molded in a mold having a perforated bottom from which the water is removed under a vacuum of 0.01 to 0.04 MPa.

4. The process according to claim 1, wherein an alcoholic solution of polyethoxysiloxane is used as the organosilicon binder, the amount of polyethoxysiloxane, evaluated as $SiO_2$, being 5 to 25 weight % in relation to the weight of the quartz fiber.

5. The process according to claim 1, wherein, when amorphous boron is used as a boron containing sintering adjuvant, it is pre-treated with a solution of 0.5 to 3.0 weight % of trimethylchlorosilane in an organic solvent, and then dried at a temperature of up to 300° C.

6. The process according to claim 1, wherein the surface-active agent is non-ionic.

7. The process according to claim 1, wherein the emulsion is formed by mixing in water: an alcoholic solution of polyethoxysiloxane, a surface-active agent and amorphous boron powder the mean particle diameter of which is 0.5 to 2.0 μm, for 1 to 2 minutes, in a blender the propeller mixer of which has a speed of rotation of 2500 to 4000 rpm, the quantity of boron in the emulsion having a value of 0.5 to 2.5 weight % in relation to the weight of the fiber.

8. The process according to claim 1, wherein the step of mixing the green fibrous block dispersed in water with the emulsion is carded out in a blender provided with a planetary mixer having a speed of rotation from 50 to 150 rpm, at a fiber concentration of 1.5 to 6.0 volume %.

9. The process according to claim 1, wherein the molded green billet is compressed between perforated plates in such a way that the height of the billet is reduced by a value of up to 10% of its initial height.

* * * * *

UNITED STATES PATENT AND TRADEMARK OFFICE
CERTIFICATE OF CORRECTION

PATENT NO. : 5,569,423

DATED : October 29, 1996

INVENTOR(S) : Ludmila V. BELUNOVA et al.

It is certified that error appears in the above-identified patent and that said Letters Patent is hereby corrected as shown below:

On the Title Page:

[56] References Cited:

506162  9/1992  European Pat. Off., should be --3/1992--;

522900  1/1993  European Pat. Off., should be --6/1992--; and 2684369  6/1993  France, should be --22684369  4/1993--.

Column 2, line 41, please delete "therefor".

Column 3, line 9, after ";", please insert --and--; and

Column 3, line 10, please delete "300° C.".

Column 4, line 1, after ""kg/mkg/m$^3$", please insert --,--;

Column 4, line 37, shouldn't "mould" be --mold-- (we did not request this change); and Column 4, line 65, shouldn't "rmp" be --rpm-- (we did not request this change)

Column 6, line 57 (claim 8, line 3), please delete "carded" and insert therefor --carried--.

Signed and Sealed this

Twenty-fourth Day of June, 1997

*Attest:*

BRUCE LEHMAN

*Attesting Officer*   Commissioner of Patents and Trademarks